United States Patent [19]
Miller et al.

[11] Patent Number: 5,760,507
[45] Date of Patent: Jun. 2, 1998

[54] ELECTRICAL GENERATING SYSTEM FOR A MOTOR VEHICLE

[75] Inventors: John Michael Miller, Saline; Roy Edward Diehl; Thomas Alexander Bush, both of Northville; Satvir Singh Deol, Belleville, all of Mich.

[73] Assignee: Ford Global Technologies, Inc., Dearborn, Mich.

[21] Appl. No.: 597,673

[22] Filed: Feb. 6, 1996

[51] Int. Cl.$^6$ ............................................. H02K 19/10
[52] U.S. Cl. ............................. 310/74; 310/153; 310/218
[58] Field of Search ............................ 310/74, 89, 218, 310/254, 153

[56] References Cited

U.S. PATENT DOCUMENTS

| | | | |
|---|---|---|---|
| 2,117,018 | 5/1938 | Conrad et al. | 171/313 |
| 2,993,134 | 7/1961 | Harvey | 310/218 |
| 3,317,765 | 5/1967 | Cone | 310/218 |
| 3,629,632 | 12/1971 | Loupe | 310/74 |
| 3,694,661 | 9/1972 | Minowa | 310/168 |
| 3,793,544 | 2/1974 | Baumgartner et al. | 320/17 |
| 3,818,586 | 6/1974 | Harkness et al. | 29/598 |
| 4,404,513 | 9/1983 | Campen | 322/90 |
| 4,458,156 | 7/1984 | Maucher et al. | 310/74 |
| 4,550,280 | 10/1985 | Freise | 310/74 |
| 4,799,309 | 1/1989 | Cinzori et al. | 29/596 |
| 4,980,592 | 12/1990 | Olmr et al. | 310/153 |
| 5,021,698 | 6/1991 | Pullen et al. | 310/156 |
| 5,287,518 | 2/1994 | Miller et al. | 320/61 |
| 5,341,060 | 8/1994 | Kawamura | 310/153 |

FOREIGN PATENT DOCUMENTS

| | | | |
|---|---|---|---|
| 340029A2 | 11/1989 | European Pat. Off. | H02J 7/14 |
| 340913A2 | 11/1989 | European Pat. Off. | H02J 7/14 |
| 4225359C1 | 3/1994 | Germany | H02K 11/00 |
| 0803080 | 2/1981 | U.S.S.R. | 310/89 |

Primary Examiner—Steven L. Stephan
Assistant Examiner—B. Mullins
Attorney, Agent, or Firm—Mark S. Sparschu

[57] ABSTRACT

In one embodiment of the present invention, an electrical generating system includes a flywheel having an electrical generator rotor portion. The flywheel is at least partially enclosed by a housing. One or more electrical generator stator portions are mounted in opposition to the electrical generator rotor portion such so as by attaching the electrical generator stator portions to extend through the housing. The electrical generator stator portions each have a direct-current output, the direct-current outputs capable of being coupled together in parallel. Where a variable number of electrical loads are available on a given model of motor vehicle, a variable number of electrical generator stator portions may be provided.

5 Claims, 3 Drawing Sheets

5,760,507

ELECTRICAL GENERATING SYSTEM FOR A MOTOR VEHICLE

BACKGROUND OF THE INVENTION

1. Field of the Invention

The present invention relates to electrical generating systems for motor vehicles.

2. Description of the Related Art

To generate electrical power in a motor vehicle, a conventional alternator is typically coupled by a drive belt to the crankshaft of the vehicle's engine. Such a traditional power generating scheme can have a number of limitations. First, the traditional location of the alternator on the vehicle's engine can cause the overall packaging "envelope" of the engine to increase in size. Where packaging in an engine compartment is tight, this can be a significant disadvantage. Second, a conventional alternator can be an expensive means for generating electricity in a motor vehicle. Provisions must be provided to drive the alternator's rotor, and the rotor itself can be viewed as a redundant rotating element when one considers that the crankshaft of the engine is already rotating. A conventional alternator can also be seen as an expensive means for generating electricity because a given alternator has a fixed power output capacity. By contrast, a given motor vehicle model can have a wide array of optional features which presents a variable requirement for electrical generating capacity. Using a single alternator with sufficient generating capacity for highly-contented vehicles can represent a waste of generating capacity when used on a lesser-contented vehicle of the same model.

Therefore, an electrical generating system for a motor vehicle which is more space-efficient and cost-effective can provide advantages over the prior art.

SUMMARY OF THE INVENTION

The present invention provides a generating system for a motor vehicle having an engine with a crankshaft. The system comprises a rotating member coaxially coupled to the crankshaft for rotation therewith, the rotating member including an electrical generator rotor portion. Additionally, the system contains a housing at least partially enclosing the rotating member. The system also includes at least one electrical generator stator portion disposed in opposition to the electrical generator rotor portion, wherein the at least one electrical generator stator portion is coupled to the housing and extends through an opening in the housing.

The present invention also provides a second generating system for a motor vehicle having an engine.

The system includes a flywheel coupled to the engine and including an electrical generator rotor portion. The system also comprises a housing at least partially enclosing the flywheel. The system further comprises a plurality of electrical generator stator portions disposed in opposition to the electrical generator rotor portion.

The present invention additionally provides a method for manufacturing a generating system for a motor vehicle having a variable number of electrical loads, an engine, and a flywheel coupled to the engine and having an electrical generator rotor portion. The method comprises selecting a variable number of generator modules, each generator module comprising an electrical generator stator portion, the variable number of generator modules sufficient to supply electrical power to the variable number of electrical loads. The method also includes installing the generator modules with the electrical generator stator portions in electromagnetic communication with the electrical generator rotor portion.

Electrical generating systems according to the present invention can provide advantages of space-efficiency and cost-effectiveness over alternative systems.

DETAILED DESCRIPTION OF THE PREFERRED EMBODIMENT

Figure 1:
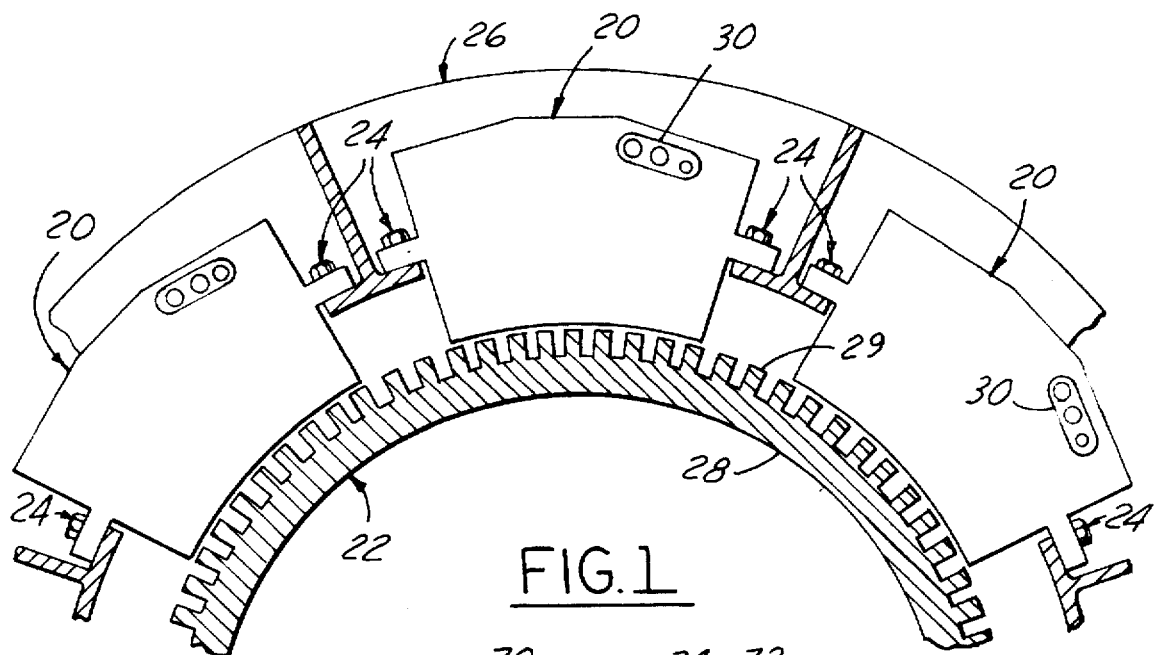
FIG. 1 illustrates an electrical generating to system according to one embodiment of the present invention.

Referring to FIG. 1, a generating system according to one embodiment of the present invention will be described. The system includes generator modules 20 and flywheel 22. Generator modules 20 are bolted by bolts 24 to bell housing 26. Bell housing 26 encloses flywheel 22, which is bolted in a conventional manner to the crankshaft of a motor vehicle engine (not shown). A portion of the periphery of flywheel 22 forms a rotor 28 having teeth 29. An electrical connector 30 is provided in the housing of each generator module 20. Sufficient sealing means, such as gaskets, are provided to prevent leakage of water and dirt past generator modules 20 into the interior of bell housing 26.

Figure 3:
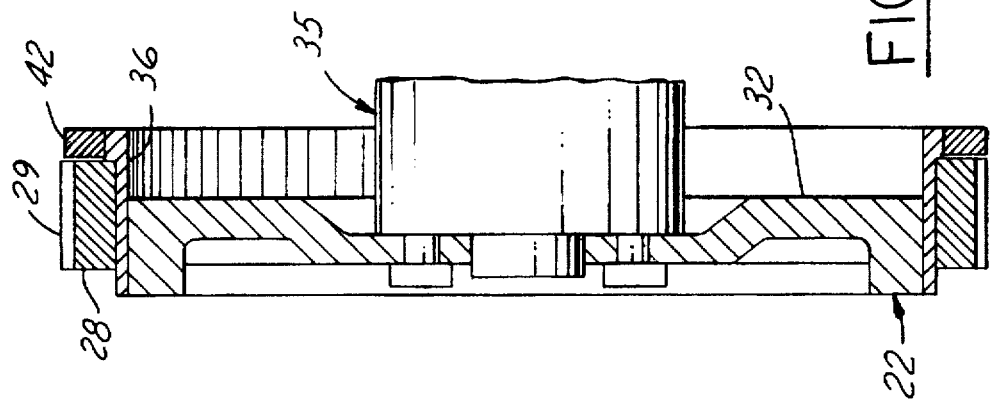
FIG. 3 illustrates a cross-sectional side view of flywheel 22, further showing a crankshaft 35 bolted to flywheel 22.
Figure 2:
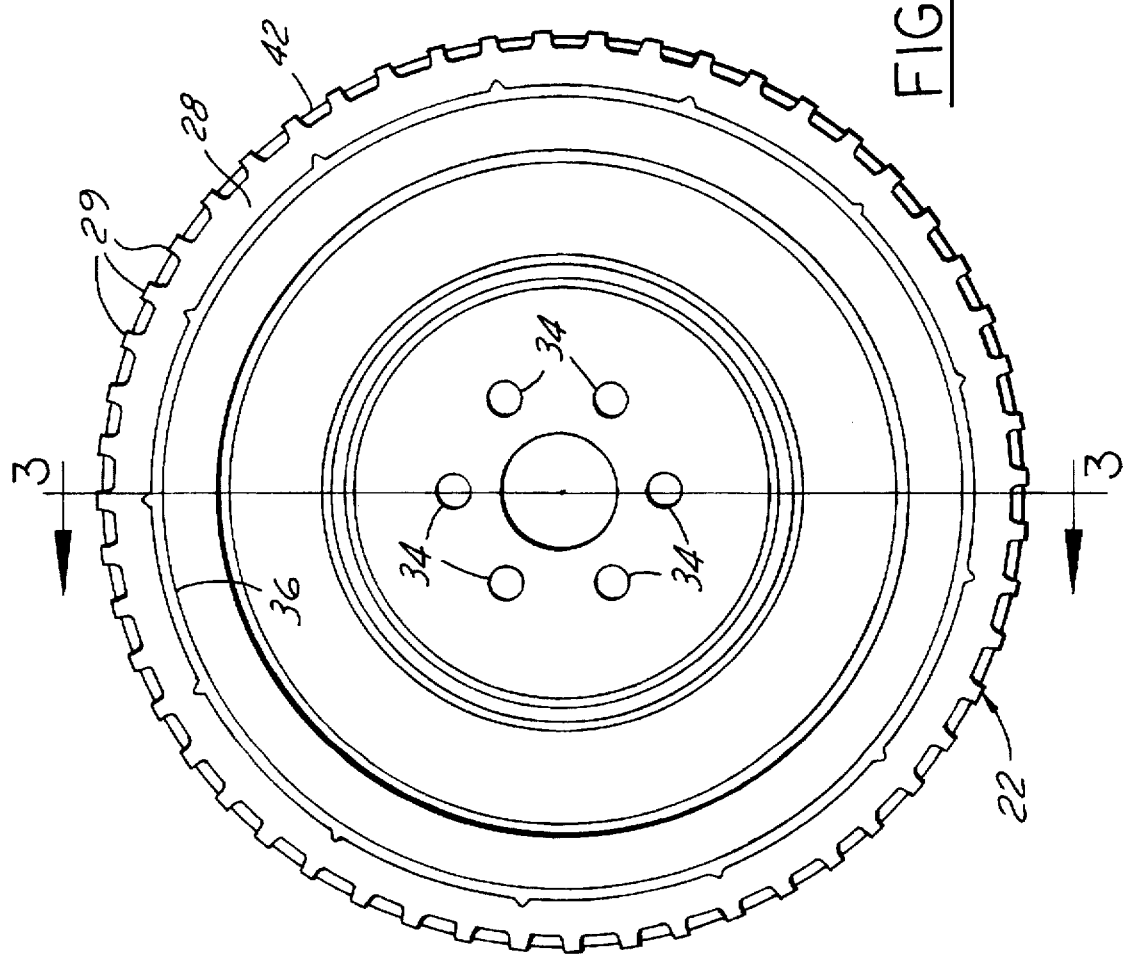
FIG. 2 illustrates a front view of flywheel 22 of FIG. 1.

Referring additionally to FIGS. 2 and 3, flywheel 22 will be described in more detail. Flywheel 22 includes a conventional flywheel portion 32, having holes 34 through which flywheel 22 bolts to an engine crankshaft 35. Welded or otherwise suitably fastened to conventional flywheel portion 32 is a steel collar 36. Tack-welded or otherwise suitably fastened to collar 36 is rotor 28. Rotor 28 is preferably made of laminations of ferromagnetic material such as iron.

Rotor 28 is preferably constructed of material which is not permanently magnetized. Rotor 28 includes teeth 29.

Also welded or otherwise suitably fastened to collar 36 is ring gear 42. Ring gear 42 is provided to perform the conventional function of a flywheel ring gear (i.e., interface with a cranking motor for the purpose of cranking the engine).

It should be noted that the inertia of flywheel 22 is not necessarily changed by the addition of rotor 28, so long as a compensating amount of mass is removed from conventional flywheel portion 32.

Figure 4:
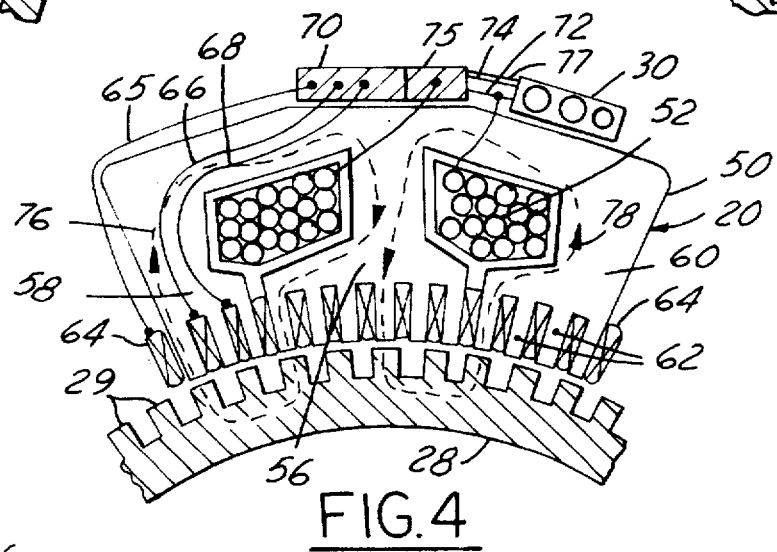
FIG. 4 is a cross-sectional view of a generator module 20 and rotor 28 of FIG. 1.
Figure 5:
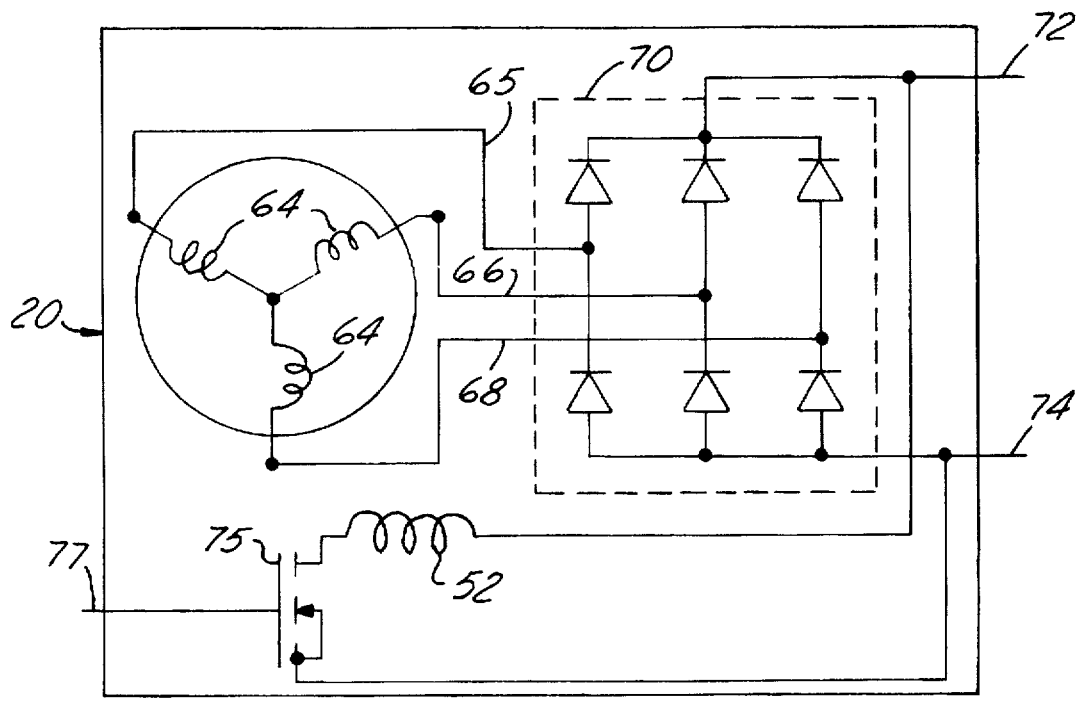
FIG. 5 is an electrical schematic of a generator module 20.

Refer now to FIGS. 4 and 5. Generator modules 20 each include a stator portion 50. Stator portion 50 is preferably laminated and is made of ferromagnetic material such as iron. Stator portion 50 comprises three poles 56, 58 and 60. Each pole contains a number of teeth 62 disposed opposite teeth 29 of rotor 28. Wound around each tooth 62 of stator portion 50 is a portion of a power winding 64. Preferably, power winding 64 is a three-phase winding, with the phases alternating among teeth 62. The three phases terminate via wires 65, 66 and 68 in rectifier assembly 70. Rectifier assembly 70 is provided according to any configuration known in the art. For example, rectifier assembly 70 can be a six-diode full-wave rectifier. The direct-current (DC) output of rectifier assembly 70 is provided via wires 72 and 74 to two cavities of connector 30. The voltage on wire 72 has a positive polarity relative to the voltage on wire 74.

Generator modules 20 each further include a field coil 52. Field coil 52 couples at its "high" side to positive output wire 72. At its "low" side, field coil 52 terminates in the drain of a field effect to transistor (FET) 75. The source of FET 75 is coupled to output wire 74. A wire 77 coupled to the gate of FET 75 is provided to one terminal of connector 30. Field current for field coil 52 is thus provided from power generated by generator module 20 and can be controlled via a low-current signal provided to wire 77.

When DC field current is provided via field coil 52, poles 56, 58 and 60 become magnetized. Pole 56 is magnetized with one magnetic polarity, and poles 58 and 60 become magnetized with the opposite polarity. Rotation of rotor 28 then causes the magnetic flux through teeth 62 of stator portion of 50 to vary as teeth 29 of rotor 28 pass. This varying flux generates three-phase electrical power in power winding 64.

The configuration of stator portion 50 into a center pole 56 and two "half poles" 58 and 60 provides a distinct advantage over possible alternative configurations. For example, if merely two poles were provided, all flux generated by field coil 52 would pass in a single path. This would tend to saturate the iron of rotor 28 unless a considerable thickness of iron were provided. However, in the present design, the flux generated by field coil 52 is split, a portion 76 returning via pole 58 and a portion 78 returning via pole 60. The tendency to saturate the iron of rotor 28 is reduced, allowing rotor 28 to be made very thin. This reduces the size of rotor 28, providing an advantage in packaging the generating system of the present design.

Figure 6:
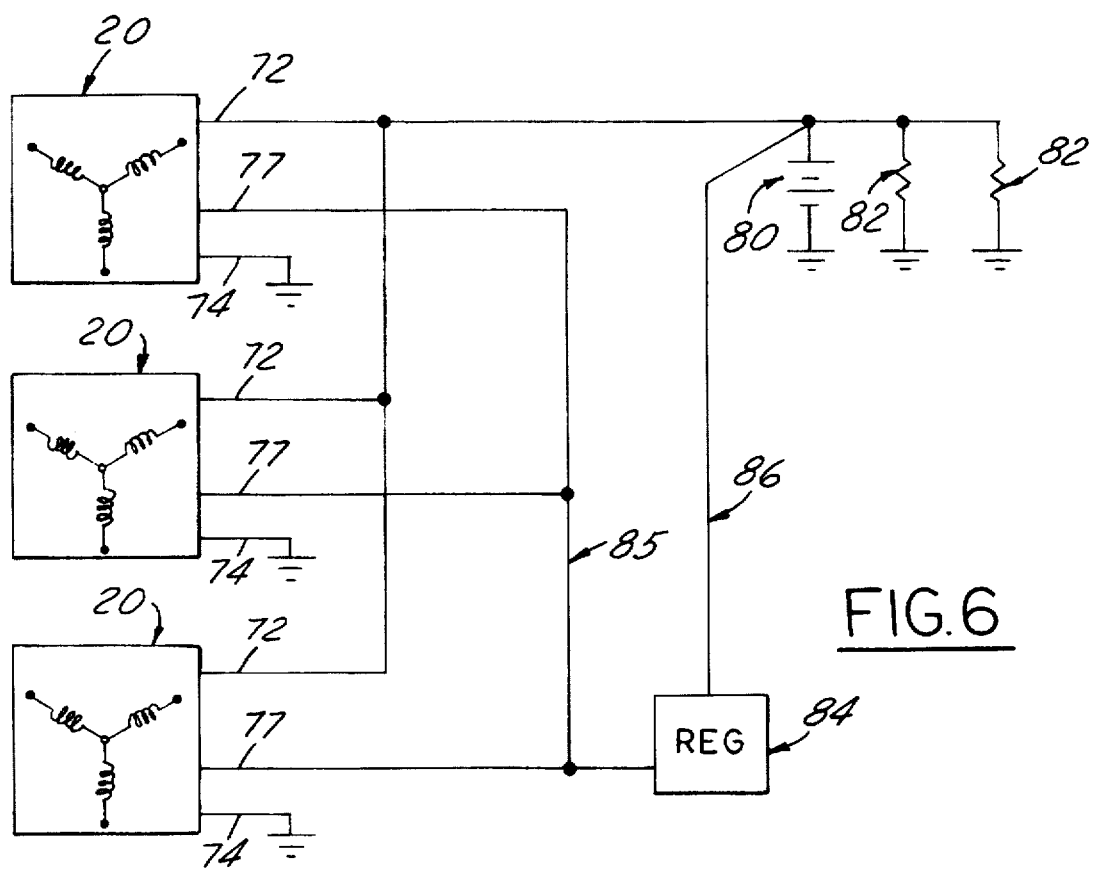
FIG. 6 is an electrical schematic showing an interconnection of three generator modules 20, according to one embodiment of the present invention.

Refer now to FIGS. 1 and 6. In the present design, multiple generator modules 20 can be provided. Three such generator modules 20 are shown in FIGS. 1 and 6. The DC power outputs of these generator modules 20 can be combined together (such as by connecting in parallel or wire-ORing) to provide power for charging battery 80 and operating other electrical loads 82 of the vehicle. The provisions for combining the DC outputs of generator modules 20 are provided, for example, in the wire harness of the vehicle.

Further, a voltage regulator 84 is provided.

Voltage regulator 84 is preferably coupled via circuit 85 to control field current to all field coils 52 of generator modules 20. Any voltage regulator design known to the art can be employed as voltage regulator 84. A sense line 86 can provide battery voltage feedback to regulator 84, which then controls field current to generator modules 20 in order to effect a predetermined target voltage at battery 80. The inclusion of FETs 75 for control of field currents in generator modules 20 is of particular advantage in situations, such as here, where voltage regulator 84 simultaneously controls the field currents in generator modules 20 via a single circuit 85. Such a single circuit 85, having a fairly long routing and a number of connections, may be susceptible to inadvertent short-circuiting. The short-circuiting can occur, for example to ground, if the wire of circuit 85 rubs against a metal component in the vehicle, chafing through the insulation on the wire. With voltage regulator 84 providing only a signal-level signal to control the field currents via FETs 75, as opposed to directly providing the field current itself, a short circuit on circuit 85 will not have permanently-damaging consequences to circuit 85 or to voltage regulator 84.

In the event that a significant number of electrical loads 82 are "optional" equipment on the vehicle, a variable number of generator modules 20 can be provided. That is, the number of generator modules 20 installed on a particular vehicle would depend on the amount of "optional" equipment on that particular vehicle. Therefore, two vehicles of the same model assembled at the same assembly plant can have a different number of generator modules installed. This capability allows the assembly of vehicles to be optimized, avoiding the installation of unnecessary electrical generating capability on the vehicles.

If a vehicle is designed to accommodate a variable number of generator modules 20, covers with appropriate sealing means can be bolted over any openings in bell housing 26 from which generator modules 20 are omitted.

Figure 7:
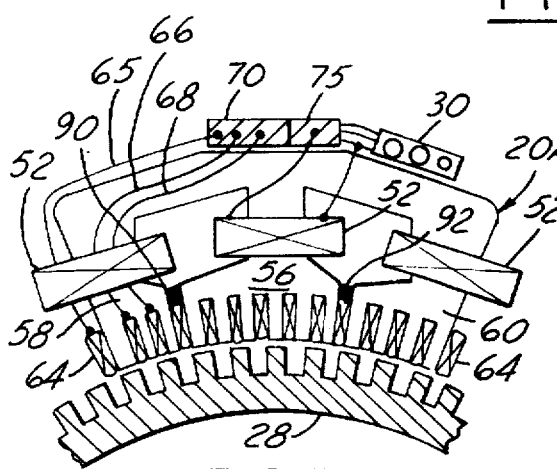
FIG. 7 is a cross-sectional view of an alternative design for a generator module 20A.

Referring now to FIG. 7, an alternative configuration for a generator module 20A is illustrated.

Here, portions of field coil 52 are wound around each of poles 56, 58 and 60. The result is that the overall size of generator module 20A may be reduced, since large "end turns" associated with a single winding around pole 56 will be eliminated.

Another feature illustrated in FIG. 7 is the provision of two permanent magnets 90 and 92. Permanent magnet 90 is provided between pole 56 and pole 58.

Permanent magnet 92 is provided between pole 56 and pole 60. Permanent magnets 90 and 92 are oriented to counteract leakage flux which may tend to directly link pole 56 and poles 58 and 60, respectively. Such leakage flux does not link rotor 28 and therefore does no productive work. The leakage flux merely acts to saturate poles 56, 58 and 60. Counteracting that leakage flux can improve the efficiency of generator module 20A.

Permanent magnets 90 and 92 can be adhesively fastened within generator module 20A, such as with the same epoxy or varnish which can be used to secure field coil 52 and power winding 64.

Figure 8:
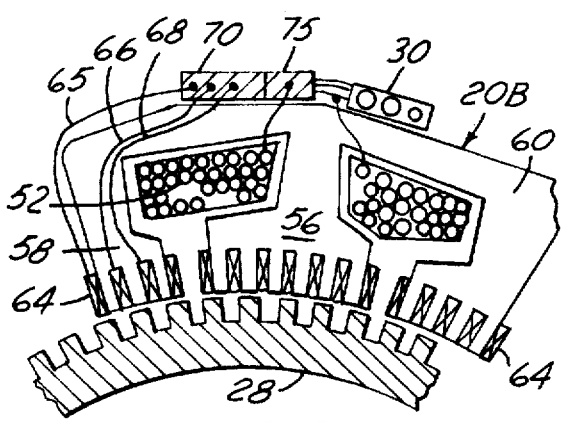
FIG. 8 is a cross-sectional view of another alternative design for a generator module 20B.

Referring now to FIG. 8, another alternative configuration for a generator module 20B is illustrated. Here, poles 58 and 60 are moved away from pole 56. This configuration reduces leakage flux between pole 56 and poles 58 and 60, improving the efficiency of generator module 20B.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A generating system for a motor vehicle having an engine with a crankshaft, said system comprising:

a rotating member coaxially coupled to said crankshaft for rotation therewith, said rotating member including an electrical generator rotor portion;

a housing at least partially enclosing said rotating member; and at least one electrical generator stator portion disposed in opposition to said electrical generator rotor portion; wherein said at least one electrical generator stator portion is coupled to said housing and extends through an opening in said housing;

said rotating member is a flywheel;

said electrical generator rotor portion comprises teeth disposed about a periphery of said rotor portion;

said teeth of said electrical generator rotor portion are not permanently magnetized;

said at least one electrical generator stator portion comprises a plurality of teeth in opposition to at least some of said teeth of said electrical generator rotor portion;

at least some of said teeth of said at least one electrical generator stator portion are each wound with a portion of an electrical-generating winding each said at least one electrical generator stator portion further comprises a field winding in electromagnetic communication with at least some of said teeth of said electrical generator stator portion; and wherein for each said at least one electrical generator stator portion:

a first fraction of said teeth of said electrical generator stator portion are located at an end of a first leg of said electrical generator stator portion containing at least a portion of said field winding of said electrical generator stator portion;

a second fraction of said teeth of said electrical generator stator portion are located at an end of a second leg of said electrical generator stator portion, said second leg in electromagnetic communication with said first leg; and a third fraction of said teeth of said electrical generator stator portion are located at an end of a third leg of said electrical generator stator portion, said third leg in electromagnetic communication with said first leg.

2. A generating system as recited in claim 1, further comprising exactly one voltage regulator and wherein electrical current through said field winding of each at least one electrical generator stator portion is controlled by said voltage regulator.

3. A generating system as recited in claim 1, wherein at least one of said first, second and third legs has a different magnetic polarity than at least one other of said first, second and third legs.

4. A generating system for a motor vehicle having an engine, said system comprising:

a flywheel coupled to said engine and including an electrical generator rotor portion;

a housing at least partially enclosing said flywheel; and a plurality of electrical generator stator portions disposed in opposition to said electrical generator rotor portion; wherein said electrical generator stator portions each further comprise a field coil disposed to generate magnetic flux coupling said electrical generator stator portion and said electrical generator rotor portion;

said electrical generator stator portions each further comprise three pole portions in electromagnetic communication with said field coil; and wherein for each said electrical generator stator portion:

said electrical generator stator portion comprises a plurality of teeth disposed in opposition to said rotor portion;

at least some of said teeth are each wound with a portion of an electrical generating winding;

a first fraction of said teeth are located on said first pole portion;

a second fraction of said teeth are located on said second pole portion; and a third fraction of said teeth are located on said third pole portion.

5. A generating system as recited in claim 4, wherein at least one of said first, second and third pole portions has a different magnetic polarity than at least one other of said first, second and third pole portions.

* * * * *